Feb. 27, 1934.  E. A. DAVIS  1,948,961
PLOW
Filed Sept. 19, 1931  3 Sheets-Sheet 3

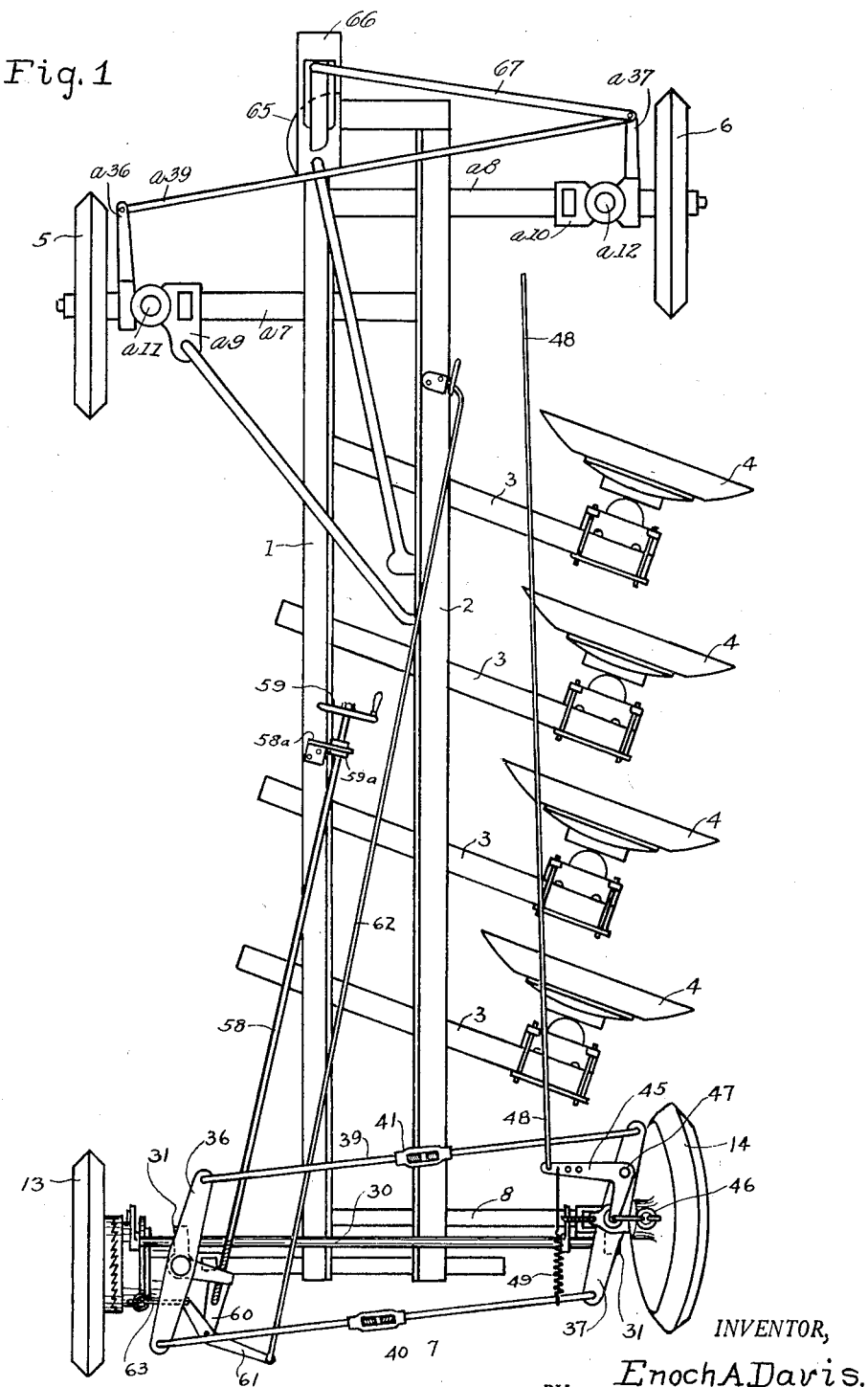

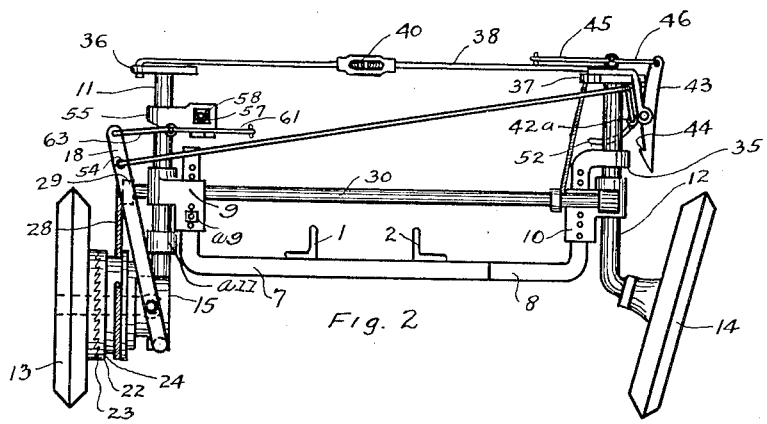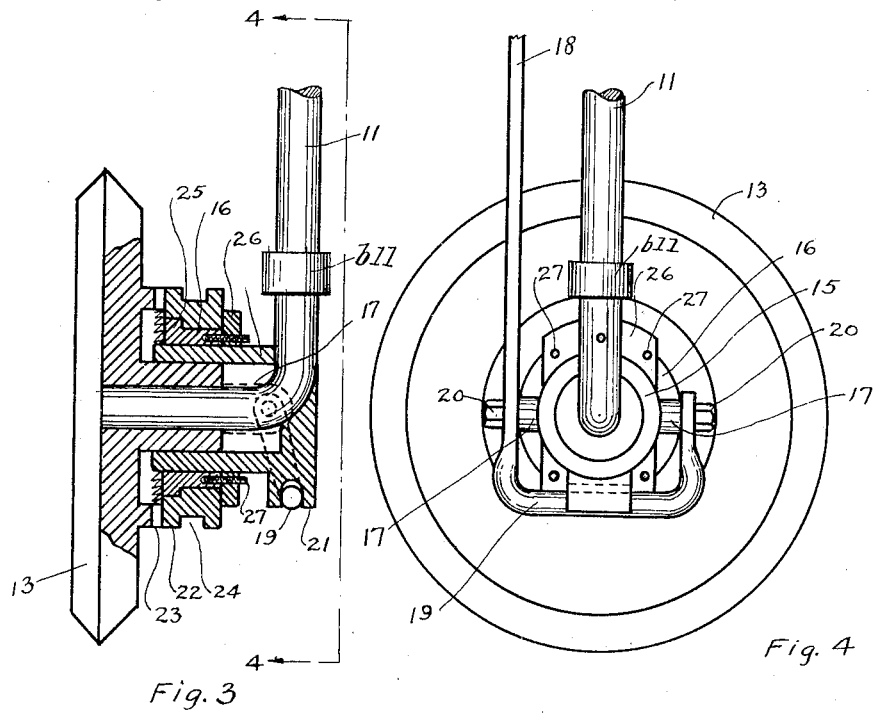

INVENTOR,
Enoch A. Davis.
BY David E. Lain,
ATTORNEY.

Patented Feb. 27, 1934

1,948,961

UNITED STATES PATENT OFFICE

1,948,961
PLOW

Enoch A. Davis, Marietta Township, Whatcom County, Wash., assignor to Edna Riffe, Marietta, Wash.

Application September 19, 1931, Serial No. 563,857
In Canada October 11, 1930

3 Claims. (Cl. 97—72)

This invention relates to improvements in disc plows. The principal object of the invention is to provide a means whereby the discs may be easily and quickly lifted out of the soil and dropped in again. This is very important especially in turning corners, and the like. This has been one of the main difficulties with other plows as the time required has been rather long, thus making the work of plowing rather slow. In turning corners by the time the plow has been lifted out of the soil and dropped back in considerable distance has been covered, often leaving as much as twenty or more feet of unplowed ground in each turn. This means considerable waste ground unless gone over with another plow.

I overcome these and other objections by the peculiar arrangement and combination of the parts, as will be more fully hereinafter explained in the following specification, shown in the accompanying drawings and finally pointed out in the appended claims.

In the drawings, Fig. 1 is a plan view of the plow with a few parts omitted.

Fig. 2 is a rear view.

Fig. 3 is a cross section taken through the operating clutch.

Fig. 4 is a view taken upon the line 4—4 of Fig. 3.

Figure 5:
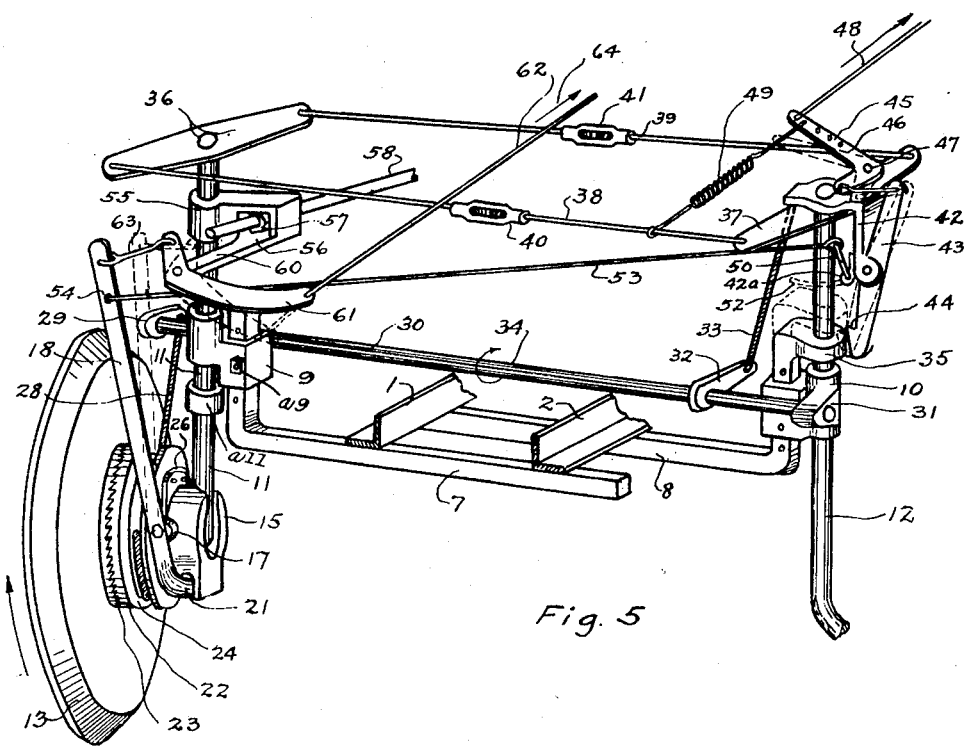
Fig. 5 is a perspective of the rear end of the plow, showing my invention attached.

Referring now more particularly to the drawings, Fig. 1 represents a plan view of my plow as described in my patent Number 1,704,178. Reference numerals 1 and 2 indicate two parallel frame bars or beams which are secured together in frame relation by the plow-member brackets 3, 3, etc. fastened thereto. To the plow brackets 3 are fastened the plow members 4. The frame rear axle preferably is in two parts 7 and 8 which preferably are spaced apart and both are fastened to the frame beams 1 and 2, near the rear ends thereof. On the outer end of frame axle 7 is fastened vertical bearing 9, and on the outer end of frame axle 8 is fastened vertical bearing 10. The rear auxiliary axle 11 is L shape and the shank thereof is mounted in vertical bearing 9 for reciprocation and oscillation and the rear land power wheel 13 is mounted on the arm thereof for revolution. The rear auxiliary axle 12 is L shape and the shank thereof is mounted in the vertical bearing 10 for reciprocation and oscillation while on the arm thereof is mounted the rear furrow wheel 14 for revolution.

On the auxiliary axle 11 is the annular boss $b11$ providing a stop to limit the downward movement of the axle block 9 on the said axle. The bolt $b9$ is extended through registering holes through the block 9 and the upturned end of the axle part 7, slidable therein, to retain the said axle end from moving in the said block. To axle 11 and wheel 13 is attached a mechanism for raising the plow which can be lowered at will from the driver's seat.

This lifting mechanism consists of cylindrical drum 15 securely mounted to the lower curved portion of axle 11. Slidably mounted upon this drum is a circular collar 16 provided with lugs 17. This collar can be shifted back and forth on the drum 15 by means of lever 18. This lever is U-shaped at its lower end as shown at 19, (see Fig. 4). The lever 18 is pivoted to the lugs 17 by means of bolts 20 and the lower or U-shaped portion of the lever passing through the channel 21 formed on the lower side of the drum 15. Rotatably mounted on the drum 15 is a clutch ring 22 provided with teeth 23 and a groove 24. This clutch ring is held in place laterally on the collar 16 by means of shoulder 25 and the retaining blocks 26 secured in place by means of screws 27. The wheel 13 is also provided with teeth to coact with the teeth 23 on the clutch ring 22. The clutch ring 22, it is evident may be engaged or disengaged from the wheel 13 by shifting the lever 18. When the clutch is engaged and the wheel 13 turning as in plowing, it is evident that the clutch ring 22 will rotate with it. Wrapped partly around the groove 24 of the clutch ring 22 is a cable or chain 28, (see Figs. 2 and 5). The upper end of the cable 28 is secured to a crank 29. Crank 29 is secured to the outer end of a rock shaft 30 rotatably mounted in lugs 31 of blocks 9 and 10. On the other end of the rock shaft 30 is fastened the crank 32 substantially parallel with and projected in the same direction as the said crank 26. To the crank 32 is fastened the lower end of the cable 33, the upper end of which is fastened to the bracket 42 which is fastened on the top of the auxiliary axle 12.

At the front end of the plow the plow beams 1 and 2 are fastened to the front axle parts $a7$ and $a8$. On the outer end of the front axle part $a7$ is fastened the vertical bearing block $a9$ in which is mounted for reciprocation the vertical arm of the auxiliary or supplemental axle $a11$. The said axle arm has an annular boss thereon, not shown, similar to the boss $b11$ on the rear supplemental axle 11 to limit the downward movement of the said block $a9$ thereon. The outer end of the front axle part $a8$ is turned upward, similar to the outer end of the rear axle part 3, and slidably engaged in the block a10. The block a10 is similar to the said block 10 and has a vertical bearing in which is mounted the vertical arm of the auxiliary or supplemental axle a12 for reciprocation. The arm a37 is fastened to the vertical stem of the axle a12. The arm a36 is fastened to the vertical stem of the auxiliary axle a11 and both of the arms a36 and a37 project forward. The arms a36 and a37 are joined by the rod a39 in pivotal connections for parallel oscillative movements whereby they oscillate the vertical stems of the auxiliary axles a11 and a12 and thus simultaneously swing the front land and furrow wheels 5 and 6 in steering movements. The plow tongue 66 is mounted for oscillation on the circular segment 65 which is fastened on the front end of the plow beams 1 and 2. The said arm a37 is connected to the tongue 66 forward of the segment 65 by the rod 67 which is pivoted to both the arm and tongue. The construction at the front end of the plow is similar to that at the rear end thereof, as described above, whereby the plow platform frame has freedom of vertical reciprocation on the vertical stems of the auxiliary axles 11, 12 and a11, a12. But, while the rear vehicle wheels 13 and 14 are steered by hand, the front vehicle wheels 5 and 6 are steered by the plow tongue 66.

Figure 6:
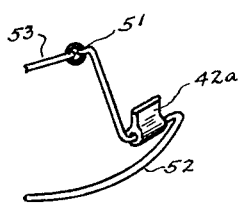
Fig. 6 is a perspective of a special lever.

Because of the boss b11 on the vertical stem of the rear land auxiliary axle 11 and a similar boss on the vertical stem of the front land auxiliary axle a11, when the clutch cable 28 is pulled downward the block 9 bears on the boss b11 and the block a9 bears on the similar boss on the axle a11 resulting in the revolution of the rock shaft 30 in the direction of the arrow 34 in Fig. 5 which lifts upward the furrow side of the plow frame and the plow discs thereon in oscillation about the ground contacts of the land wheels 5 and 13. The upper right hand end of axle 8 is bent over as at 35 and bored through to slidably receive the supplemental axle 12. To the upper ends of supplemental axles 11 and 12 are secured levers 36 and 37 connected by rods 38 and 39, provided with turn buckles 40 and 41. To the upper end of supplemental axle 12 and above lever 37 is secured a bracket 42, forked at its lower end. To the lower end of bracket 42 is pivoted a lever 43 provided with a hook 44 at its lower end, (see Figs. 2 and 5). The upper end of lever 43 is connected to the short end of a bell crank 45 by means of a link 46. Bell crank 45 is pivoted to lever 37 as shown at 47, (see Figs. 1 and 5). To the long end of the bell crank is a rod 48 passing to the driver's seat. 49 is a tension spring, one end of which is connected to rod 38 and the other end to the long end of bell crank 45. From this it is evident that unless acted upon by some other force the long end of bell crank 45 will be urged towards the back, the short end urged outwards forcing the upper end of lever 43 outward through the link 46, and the lower end of lever 43 is urged inward. To the lower and forked end of bracket 42 is a lug 42—a, bored through to receive a bell crank 50, shown more clearly in the perspective of Fig. 6. To the upper end 51 of bell crank 50 is connected a rod 53, the left hand end of which is connected toward the upper end of lever 18, as at 55, (see Figs. 2 and 5). The lower end, 52, (Fig. 6), of bell crank 50 is bent so as to very nearly touch the outturned end 35 of axle 8. Towards the upper end of supplemental axle 11, but underneath the lever 36, is rigidly secured a bracket, 55. The inside end of bracket 55 is open as shown at 56. This opening is provided with a pivot block 57 tapped so as to receive the threaded end of a shaft 58 (see Fig. 1 and Fig. 5). The end of the shaft 58 which is not threaded passes through a bracket 58—a secured to the beam 1 of the plow, and is provided with a hand wheel 59. The shaft 58 is held in place longitudinally by means of collars 59—a secured to the shaft and disposed one on each side of bracket 58—a. By turning the hand wheel 59 the bracket 55 is moved forward or backward, consequently turning the supplemental axle 11, changing the course of the wheel 13. The supplemental axle 12 will likewise be turned changing the course of the wheel 14 to correspond to that of wheel 13, due to levers 36 and 37 being parallel, by means of rods 38 and 39. In the dirigible vehicle-wheel mechanism above described the rear land and furrow wheels are mounted on oppositely-disposed, non-alined axles each of which is swingable on an upright axis, and both axles are mechanically connected together for simultaneous manual steering movements. Likewise, the front land and furrow vehicle wheels are mounted on oppositely-disposed, non-alined axles each of which is swingable on an upright axis and both of the axles are mechanically connected for simultaneous steering movements under the control of the plow tongue. From the lower side of the open end of bracket 55 extends a projection 60 to which is pivoted a bell crank 61, (see Figs. 1 and 5). To one end of bell crank 61 is connected a rod 62 passing to a lever or other suitable means for operating at the driver's seat. To the other or short end of bell crank 61 is a link 63, connecting with the upper end of lever 18.

Before describing the method of operation it will be understood that all the drawings show the parts in the relative positions just after the clutch has been engaged, but before the plow has advanced enough to start lifting the discs.

The method of operation is as follows: The rod 62 is first pulled toward the driver, as indicated by arrow 64. This moves the bell crank 61 from its dotted position to that shown by the solid lines. The lever 18 is moved to the left to the position shown in the solid lines, thus engaging the teeth of clutch ring 22 with those of the wheel 13 as shown at Fig. 2 and Fig. 5. When the plow is travelling forward the wheel 13 will rotate in the direction as indicated by the arrow. This causes the clutch ring to rotate with it tending to wind up the cable 28, which pulls the crank 29 downward, rotating rock shaft 30 as indicated by arrow 34, turning downward the crank 32 and raising the axle 8 by means of cable 33. As the upper right hand end of axle 8 is lifted to the position shown in the dotted lines the lever 43 will snap from its solid line position to that shown in the dotted lines. The hook 44 catches beneath the portion 35 of the axle 8, consequently holding the discs in a lifted position. Just before the portion 35 of the axle 8 has reached its dotted position it commences to lift the end 52 of the bell crank 50 upward, (see Figs. 5 and 6), this moves the end 51 of lever 50 to the right pulling the rod 53 with it, pulling the lever 18 back to the dotted position, thus disengaging the clutch ring 22 which in turn stops the lifting of the disc 4.

It will be readily understood that if the clutch was not disengaged at this time the continued motion of the plow would continue lifting the discs to such an extent as to stop the wheel 13 from turning or probably injure the machine.

The discs 4 will stay in a raised position until the hook 44 is disengaged from beneath part 35 of the axle 8. When it is desired to lower the discs the rod 48 is pulled towards the driver as indicated by the arrow pulling the bell crank 45 from its dotted position, (which it holds only after the discs have been lifted), to the position shown in the solid lines. This motion through link 46 moves the lever 43 from its dotted position, (which it holds only when the discs are raised), back to the solid line position, thus disengaging hook 44 from beneath portion 35 of axle 8, thus immediately dropping the discs back into the soil. Lever 43 will now remain in the position shown until the discs are again lifted due to the lower end or portion below the hook 44 bearing against the outer surface of portion 35 being consequently urged against it due to tension in spring 49.

From the relatively large diameter of clutch ring 22 and the proportion of crank 29 to crank 32 it is very clear that a very small advance of the plow will completely lift the disc out of the soil and they may be immediately released if desired, thus causing a very short delay in this operation. This in turn makes a very narrow space of unplowed ground which in many cases may be entirely neglected.

While I have shown and described a particular form of embodiment of my invention, I am aware that many minor changes will readily suggest themselves to those skilled in the art without departing from the spirit and scope of my invention. I therefore desire to avoid being limited to the particular form of embodiment which I have hereinabove shown and described.

Having described my invention, what I claim as new and desire to protect by Letters Patent is:

1. Mechanism of the character described including a substantially flat, rectangular, operatively horizontal framework, a bearing at right angles to the framework fastened on each corner thereof, a plurality of plow discs fastened on one edge of the framework, four L-shape auxiliary wheel axles having arms adapted for axles and stems mounted in the said framework corner bearings for vertical reciprocation and oscillation, a vehicle wheel mounted on each of the said wheel axles for revolution in a substantially vertical plane, a clutch fastened on one of the said vehicle wheels opposite the said plow discs, means to limit the downward movement of the framework on the stem of the axle of the said clutch wheel, mechanical connections between the said clutch and the said framework uptilting the plow edge of the framework about the ground contacts of the clutch wheel and that vehicle wheel disposed on the edge of the framework therewith by operation of the said clutch, manual means to engage the clutch for operation, automatic means to retain the framework and plows thereon in the said uptilted position, automatic means to limit the said uptilting of the framework by disengaging the clutch, and manual means to disengage the framework from said automatic retaining means for falling into operative position.

2. Mechanism of the character described including a substantially flat, rectangular, operatively horizontal framework, a bearing at right angles to the framework fastened on each corner thereof, a plurality of plow discs mounted for revolution on bearings fastened on one edge of the said framework, four L-shape auxiliary wheel axles having arms adapted for axles and stems mounted in the said framework bearings for vertical reciprocation and oscillation, a vehicle wheel mounted on each of the said arm axles for traction revolution in a substantially vertical plane, traction-operated means for uptilting the plow edge of the said framework, automatically operable means for limiting the said uptilting of the framework, automatically operable means for retaining the said framework in an uptilted position, and manual means to disengage the framework from said automatic retaining means for falling into operative position.

3. Mechanism of the character described including a substantially flat, rectangular, operatively horizontal framework, a bearing at right angles with the framework fastened on each corner thereof, a plurality of plow discs mounted for revolution in bearings fastened on one edge of the said framework, four L-shape auxiliary wheel axles having arms adapted for axles and the stems thereof mounted for vertical reciprocation and oscillation in the said corner framework bearings, traction-operated means for uptilting the plow-discs edge of the said framework, automatically operable means for limiting the said uptilting of the framework, automatically operable means for retaining the framework in the said uptilted position, a tongue mounted for horizontal oscillations on the front end of the said framework, means operable by the oscillations of the said tongue for simultaneously swinging the two front non-alined vehicle wheel axles and the wheels thereon about the said stems thereof for directing the forward movements of the said framework, and manually operable means for simultaneously swinging the two non-alined rear axles and wheels thereon about the said stems thereof for directing forward movements of the said framework.

ENOCH A. DAVIS.